H. I. ALDRICH.
FEED-COOKER.
No. 188,326.     Patented March 13, 1877.
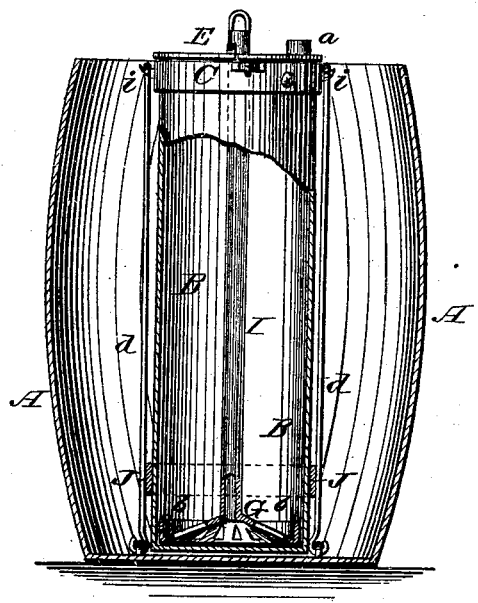
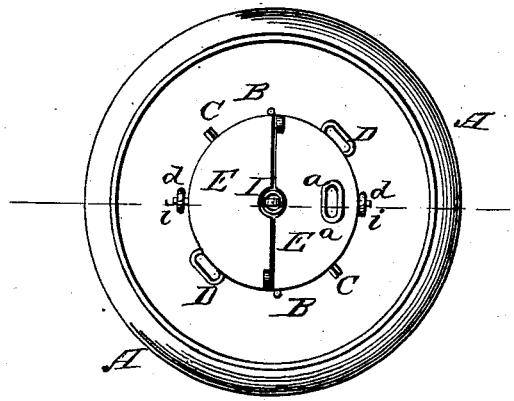
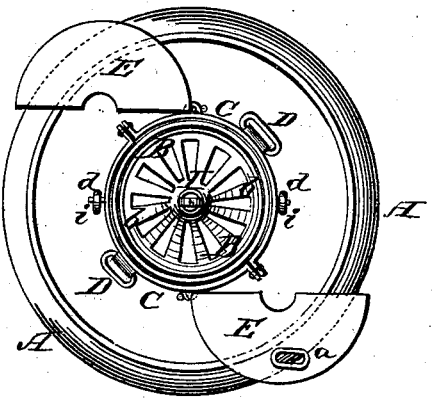
Witnesses:
P. C. Dieterich
Frank H. Duffy
Inventor:
Hosea I. Aldrich,
Per: C. H. Watson & Co., Attorneys.

UNITED STATES PATENT OFFICE.

HOSEA I. ALDRICH, OF NEW SHARON, IOWA.

IMPROVEMENT IN FEED-COOKERS.

Specification forming part of Letters Patent No. 188,326, dated March 13, 1877; application filed January 9, 1877.

*To all whom it may concern:*

Be it known that I, HOSEA I. ALDRICH, of New Sharon, in the county of Mahaska and State of Iowa, have invented certain new and useful Improvements in Feed-Cookers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a feed-cooker, as will be hereinafter more fully set forth.

In the annexed drawing, Figure 1 is a vertical section of my improved feed-cooker. Fig. 2 is a plan view of the same with the top of the cooker closed. Fig. 3 is a similar view with the top open.

A represents a cask or other receptacle, in which the feed-cooker is placed. B is the feed-cooker, made in cylindrical form, closed at the bottom, and provided around its upper edge with a clamp, C, for binding and strengthening the same. To this clamp are attached the handles D D, and also pivoted the semicircular covers E E, which close toward the center. In one of these covers is the smoke-outlet $a$, as shown.

On the bottom of the cooker B is placed a conical slotted grate, G, provided around its edge with an upwardly-projecting rim, $b$, of suitable height, and from the apex of the conical grate extends a draft-tube, I, to and above the top of the cooker, the covers E E closing around the upper end of the same.

The air passes down the tube I under the grate, and is distributed, by the conical form of the grate, outward to the fire and to the sides of the cooker. The rim $b$ around the grate confines and holds the fire, so that by lifting the grate out of the cooker all the fire will come out with it.

$d\ d$ are two rods, fastened at their lower ends by screw-eyes in the bottom of the receptacle A, and to these rods, a suitable distance from their lower ends, is fastened a band, J, through which the cooker B is passed. The upper ends of the rods $d$ are then placed on hooks $i\ i$, projecting from the clamp C, thereby holding the cooker in the center of the receptacle and down to the bottom thereof, so that it cannot rise.

This feed-cooker is cheap, simple, and durable, and not liable to get out of order. It is easily attached and detached, and can be cleaned out with but little trouble.

Having thus fully described my invention, what I claim as new, and desire to secure by Letters Patent, is—

1. The conical slotted grate G, formed with the rim $b$ and central draft-tube I, in combination with the feed-cooker B, substantially as and for the purpose set forth.

2. The combination of the cooker B, clamp C, with handles D D, and the semicircular pivoted covers E E, as and for the purposes herein set forth.

3. In combination with the receptacle A and feed-cooker B, the rods $d\ d$, band J, and hooks $i\ i$, substantially as and for the purposes herein set forth.

In testimony that I claim the foregoing as my own I affix my signature in presence of two witnesses.

HOSEA ISAAC ALDRICH.

Witnesses:
G. W. CARRELL,
ROBERT HUESTON.